US009300731B2

(12) United States Patent
Dickinson et al.

(10) Patent No.: US 9,300,731 B2
(45) Date of Patent: *Mar. 29, 2016

(54) CONNECTION FOLLOWING DURING NETWORK RECONFIGURATION

(71) Applicant: Amazon Technologies, Inc., Seattle, WA (US)

(72) Inventors: Andrew Dickinson, Seattle, WA (US); Colin Whittaker, Seattle, WA (US); Bradley Roberts, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/562,281

(22) Filed: Dec. 5, 2014

(65) Prior Publication Data
US 2015/0088960 A1    Mar. 26, 2015

Related U.S. Application Data

(63) Continuation of application No. 13/480,006, filed on May 24, 2012, now Pat. No. 8,909,780.

(51) Int. Cl.
| G06F 15/173 | (2006.01) |
| H04L 29/08 | (2006.01) |
| H04L 12/911 | (2013.01) |
| H04L 29/12 | (2006.01) |
| G06F 9/455 | (2006.01) |

(52) U.S. Cl.
CPC ............ *H04L 67/10* (2013.01); *G06F 9/45533* (2013.01); *G06F 9/45558* (2013.01); *H04L 47/70* (2013.01); *H04L 61/2503* (2013.01); *H04L 61/2514* (2013.01); *G06F 2009/45595* (2013.01); *H04L 61/2076* (2013.01); *H04L 61/6068* (2013.01)

(58) Field of Classification Search
CPC ..... H04L 67/10; H04L 47/70; H04L 61/2503; H04L 61/6068; H04L 61/2514; H04L 61/2076; H04L 29/08; H04L 29/12; H04L 12/911; G06F 9/45533; G06F 2009/45595; G06F 9/45558; G06F 9/455
USPC ...................... 709/225, 226, 227, 245; 718/1
See application file for complete search history.

(56) References Cited

U.S. PATENT DOCUMENTS

| 7,228,337 | B1 * | 6/2007 | Bornstein et al. | 709/217 |
| 7,761,595 | B1 * | 7/2010 | Drennen et al. | 709/238 |
| 8,374,183 | B2 * | 2/2013 | Alkhatib et al. | 370/392 |
| 2011/0283017 | A1 * | 11/2011 | Alkhatib et al. | 709/244 |
| 2012/0117563 | A1 * | 5/2012 | Chang et al. | 718/1 |

* cited by examiner

Primary Examiner — Cheikh Ndiaye
(74) Attorney, Agent, or Firm — Baker & Hostetler LLP

(57) ABSTRACT

An allocated IP address is remapped from a first virtual machine to a second virtual machine while maintaining existing client connections on the first virtual machine. A communication channel is established between the first and second virtual machines, and existing connections associated with the IP address are tracked. Packets addressed to the IP address are forwarded to the second virtual machine instead of the first machine. If the second virtual machine receives a packet that contains a new connection request, the new connection is established with the second virtual machine. However, if the second virtual machine receives a packet that is associated with an existing connection to the first virtual machine, then the packet is forwarded to the first virtual machine via the communication channel.

20 Claims, 7 Drawing Sheets

CONNECTION FOLLOWING DURING NETWORK RECONFIGURATION

CROSS REFERENCE TO RELATED APPLICATIONS

This application is a continuation of U.S. patent application Ser. No. 13/480,006, filed May 24, 2012, now U.S. Pat. No. 8,909,780, issued Dec. 9, 2014, the entire contents of which are incorporated herein by reference.

BACKGROUND

A data center is a facility that houses computer systems and various networking, storage, and other related components. Many organizations and businesses operate and maintain data centers to provide computing and information services to support their day-to-day operations. Data centers may also provide computing services to businesses and individuals as a remote computing service or to provide "software as a service" (e.g., cloud computing).

To facilitate increased utilization of data center resources, virtualization technologies may allow a single physical computing machine to host one or more instances of virtual machines that appear and operate as independent computer machines to a connected computer user. With virtualization, the single physical computing device can create, maintain, or delete virtual machines in a dynamic manner Data centers may also allow customers to allocate resources from one virtual machine instance to another.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
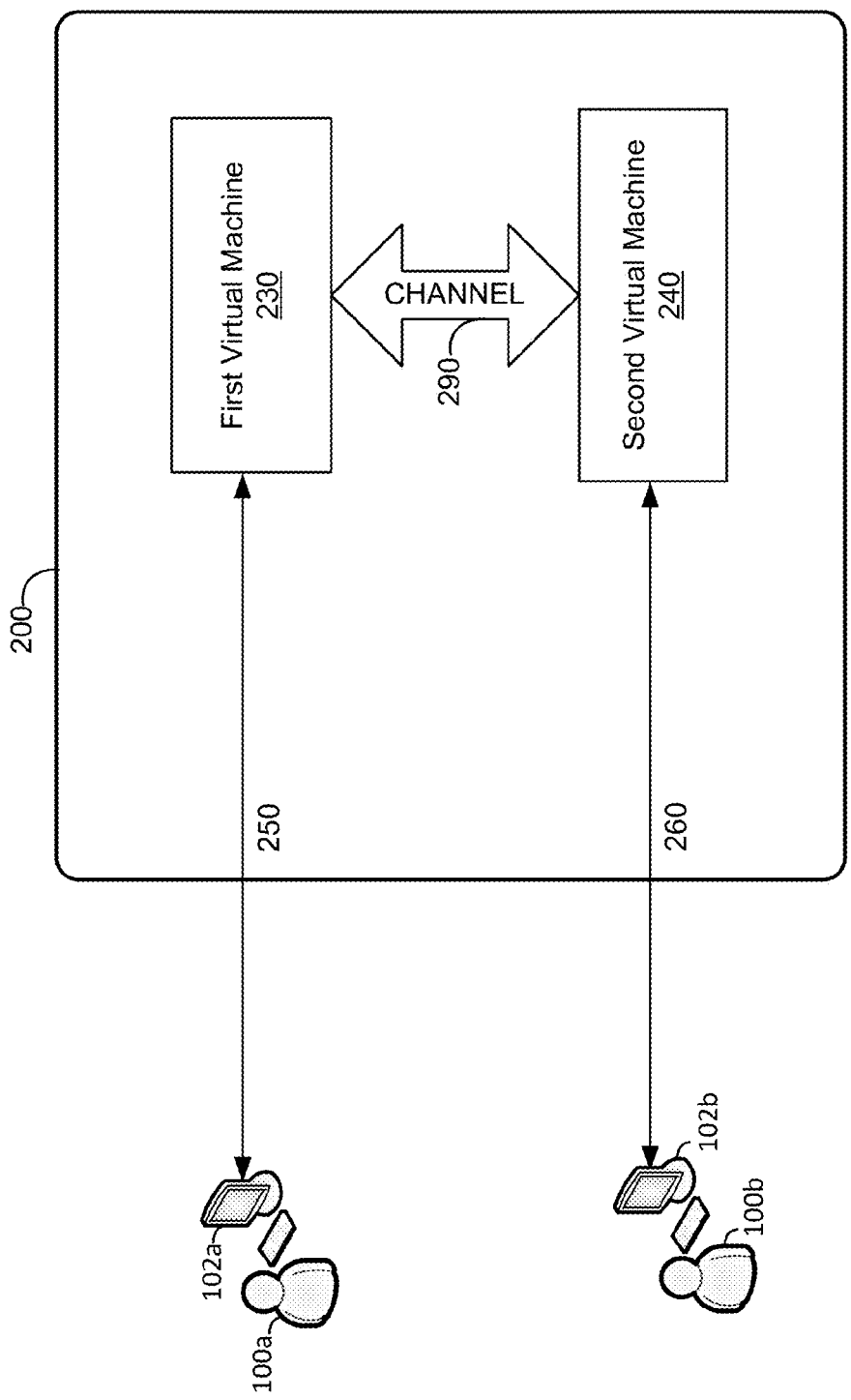
FIG. 1 is a diagram illustrating a mechanism for providing reconfigurable access to computing resources in accordance with the present disclosure.

Embodiments of systems and methods are described for allowing a data center customer to remap an allocated network address (e.g., an IP address) from a first virtual machine instance to a second virtual machine instance while maintaining existing connections to the first virtual machine instance. FIG. 1 is a diagram illustrating system 200 including a mechanism for providing reconfigurable access to computing resources in accordance with the present disclosure. FIG. 1 illustrates a first virtual machine instance 230 that is configured to provide computing resources to users via a network address. For example, first virtual machine instance 230 may have an existing connection 250 to user 100a using computer 102a. The administrator of first virtual machine instance 230 may request and launch a second virtual machine instance 240 that is configured to provide computing resources. The administrator may further request that requests to access the network address be remapped from first virtual machine 230 to second virtual machine 240. In one embodiment, a communication channel 290 (e.g., a tunnel) is established between first virtual machine instance 230 and second virtual machine instance 240. System 200 may track existing connections to the first virtual machine instance 230 and second virtual machine instance 240.

Data packets addressed to the network address are then re-addressed (e.g., NAT'ed) to the new virtual machine instance 240. If new virtual machine instance 240 receives a data packet that contains a new connection request, a new connection is established with the second virtual machine instance. For example, in FIG. 1 a new connection 260 is established between new virtual machine instance 240 and computer 102b operated by user 100b. However, if new virtual machine instance 240 receives a data packet that is associated with connection 250 to the first virtual machine instance 230, then the data packet is forwarded to the second virtual machine instance 240 via communication channel 290.

A data center may allocate an external IP address to a customer to allow networks external to the data center communicate a virtual machine assigned to the customer within the data center. The customer may be provided with the capability to re-map the external IP address from one computing device, e.g., a virtual machine instance, to another. Such a capability may be useful, for example, for customers to migrate away from an older virtual machine instance to a newer virtual machine instance, or to provide a mechanism to upgrade from a virtual machine instance with older software applications to a virtual machine instance with newer software applications. Virtual machine instances may be remapped for various other reasons. For example, the data center may move virtual machine instances between servers for maintenance purposes.

Such a remapping capability may be implemented at the point of address translation at the edge of the data center's network between an IP address on a first network and an IP address on a second network corresponding to the virtual machine instance. However, when the IP address on the first network is re-mapped from the old virtual machine instance to the new virtual machine instance, active connections to the old virtual machine instance may be broken, resulting in a disrupted session and a poor customer experience.

Various aspects of the disclosure are described with regard to certain examples and embodiments, which are intended to illustrate but not to limit the disclosure. The present disclosure is generally directed to a mechanism to allow active connections to an old virtual machine instance to continue to function while new connections are handled by a new virtual machine instance that is intended to replace the old virtual machine instance.

Figure 2:
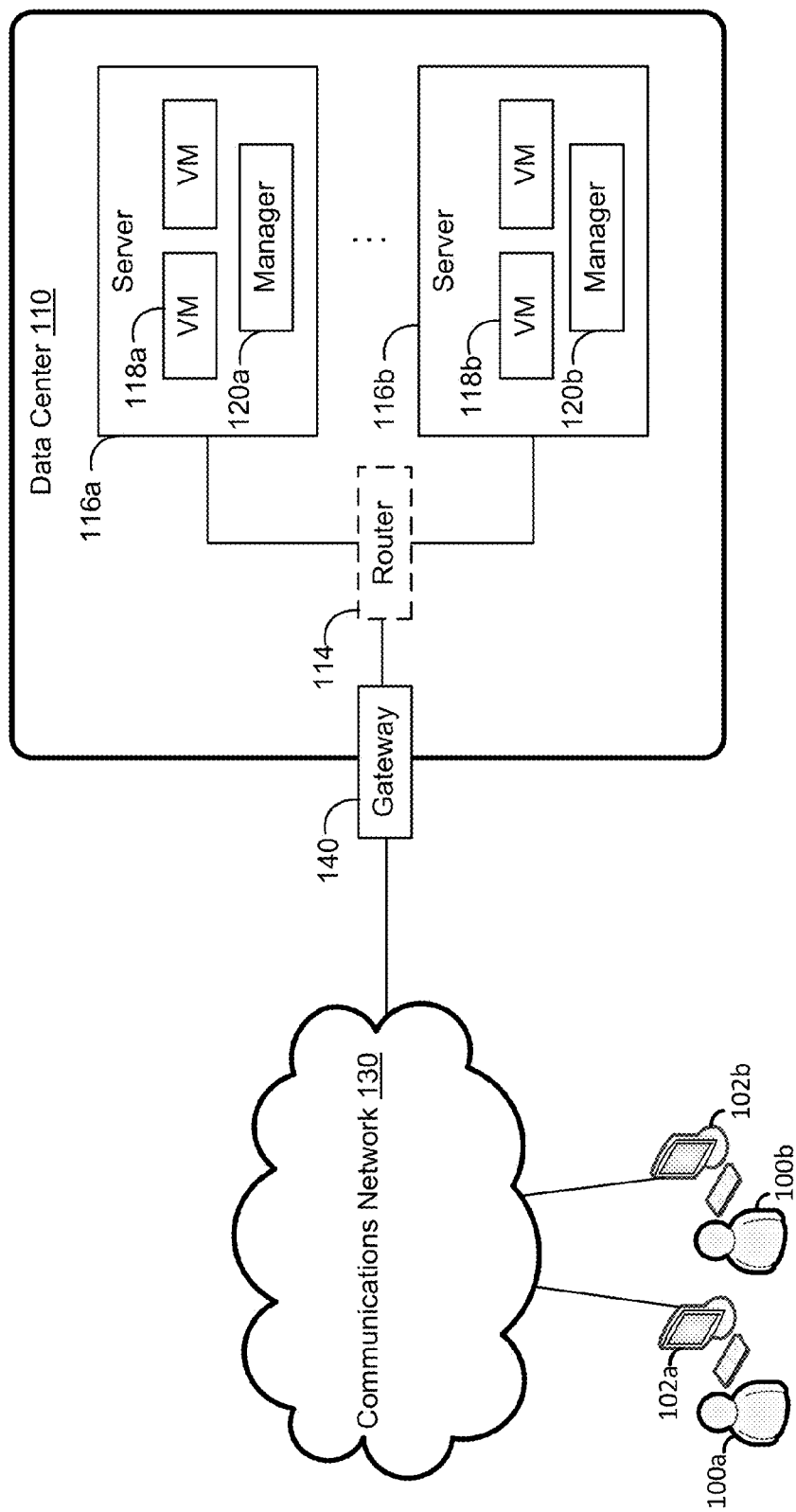
FIG. 2 illustrates an example computer system that may be used in some embodiments.

FIG. 2 illustrates an example computing environment in which the embodiments described herein may be implemented. FIG. 2 is a diagram schematically illustrating an example of a data center 110 that can provide computing resources to multiple users 100 by way of computers 102 via a communication network 130. Data center 110 may be configured to provide computing resources for executing applications on a permanent or an as-needed basis. The computing resources provided by data center 110 may include various types of resources, such as data processing resources, data storage resources, data communication resources, and the like. Each type of computing resource may be general-purpose or may be available in a number of specific configurations. For example, data center 110 may include servers 116 that provide computing resources available as virtual machine instances 118. The virtual machine instances 118 may be configured to execute applications, including Web servers, application servers, media servers, database servers, and the like. Other resources that may be provided include data storage resources (not shown), and may include file storage devices, block storage devices, and the like.

The availability of virtualization technologies for computing hardware has provided benefits for providing large scale computing resources for customers and allowing computing resources to be efficiently and securely shared between multiple customers. For example, virtualization technologies such as those provided by VMWare or other virtualization systems may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 2, communications network 130 may, for example, be a publicly accessible network of linked networks and possibly operated by various distinct parties, such as the Internet. In other embodiments, communications network 130 may be a private network, such as, for example, a corporate or university network that is wholly or partially inaccessible to non-privileged users. In still other embodiments, communications network 130 may include one or more private networks with access to and/or from the Internet.

Communication network 130 may provide access to computers 102. User computers 102 may be computers utilized by customers 100 or other customers of data center 110. For instance, user computer 102a or 102b may be a server, a desktop or laptop personal computer, a tablet computer, a wireless telephone, a personal digital assistant (PDA), an e-book reader, a game console, a set-top box, or any other computing device capable of accessing data center 110. User computer 102a or 102b may connect directly to the Internet (e.g., via a cable modem or a Digital Subscriber Line (DSL)). Although only two user computers 102a and 102b are depicted, it should be appreciated that there may be multiple user computers.

User computers 102 may also be utilized to configure aspects of the computing resources provided by data center 110. In this regard, data center 110 might provide a Web interface through which aspects of its operation may be configured through the use of a Web browser application program executing on user computer 102. Alternatively, a stand-alone application program executing on user computer 102 might access an application programming interface (API) exposed by data center 110 for performing the configuration operations. Other mechanisms for configuring the operation of the data center 110, including deploying updates to an application, might also be utilized.

Servers 116 shown in FIG. 2 may be standard servers configured appropriately for providing the computing resources described above and may provide computing resources for executing one or more applications. In one embodiment, the computing resources may be virtual machine instances 118. In the example of virtual machine instances, each of the servers 116 may be configured to execute an instance manager 120a or 120b capable of executing the virtual machine instances. The instance managers 120 may be a virtual machine monitor (VMM) or another type of program configured to enable the execution of virtual machine instances 118 on server 116, for example. As discussed above, each of the virtual machine instances 118 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 110 shown in FIG. 2, a router 114 may be utilized to interconnect the servers 116a and 116b. Router 114 may also be connected to gateway 140 which is connected to communications network 130. Router 114 may manage communications within networks in data center 110, for example by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In some embodiments, one or more of the virtual machine instances 118 of data center 110 may form part of one or more networks. In some embodiments, gateway 140 may be used to provide network address translation (NAT) functionality to a group of virtual machine instances and allow the virtual machine instances of the group to use a first group of internal network addresses to communicate over a shared internal network and to use a second group of one or more other external network addresses for communications between virtual machine instances of the group and other computing systems or virtual machine instances that are external to the group. An IP address is one example of a network address that is particularly applicable to the TCP/IP context in which some embodiments of the present disclosure can be implemented. The use of IP addresses herein is intended to be illustrative of network addresses and not limiting as to the scope of the described concepts.

Virtual machine instances 118 may be assigned a private network address (not shown). For example, the private network addresses may be unique with respect to their respective private networks but not guaranteed to be unique with respect to other computing systems that are not part of the private network. IP addresses are used to illustrate some example embodiments in the present disclosure. However, it should be understood that other network addressing schemes may be applicable and are not excluded from the scope of the present disclosure.

Gateway 140 may operate to manage both incoming communications to data center 110 from communication network 130 and outgoing communications from data center 110 to communication network 130. For example, if virtual machine instance 116a sends a message (not shown) to computer 102a, virtual machine instance 118a may create an outgoing communication that includes network address on a first network (e.g., an external public IP address) for computer 102a as the destination address and include a network address on a second network (e.g., a private IP address) for virtual machine instance 118a as the source network address. Router 114 may then use the destination address of the outgoing message to direct the message to gateway 140 for handling. In particular, in order to allow computer 102a to reply to the outgoing message, gateway 140 may temporarily map one of the public network addresses for data center 110 to virtual machine instance 118a and modify the outgoing message to replace the private network address for the source network address with the mapped public network address. Gateway 140 may then update its mapping information with the new mapping, and forward the modified outgoing message to computer 102a over the Internet.

If computer 102a responds to the modified outgoing message by sending a response incoming message (not shown) that uses the mapped public network address for virtual machine instance 118a as the destination network address, the response incoming message may be directed over the Internet to gateway 140. Gateway 140 may then perform similar processing in reverse to that described above for the outgoing message. In particular, gateway 140 may use its mapping information to translate the mapped public network address into the private network address of virtual machine instance 118a, modify the destination network address of the response incoming message from the mapped public network address to the private network address of virtual machine instance 118a, and forward the modified incoming message to virtual machine instance 118a. In this manner, at least some of the internal computers of data center 110 may communicate with external computing systems via temporary use of the public network addresses. Furthermore, in some situations, one or more of the internal computing systems of data center 110 may be mapped to use one of the public network addresses (e.g., to a unique combination of a public network address and a port number), such that external computing systems may initiate new incoming messages to the internal computing system by directing the new incoming messages to the mapped representative public network address/port as the destination network address of the new incoming messages.

It should be appreciated that the network topology illustrated in FIG. 2 has been greatly simplified and that many more networks and networking devices may be utilized to interconnect the various computing systems disclosed herein. These network topologies and devices should be apparent to those skilled in the art.

It should also be appreciated that data center 110 described in FIG. 2 is merely illustrative and that other implementations might be utilized. Additionally, it should be appreciated that the functionality disclosed herein might be implemented in software, hardware, or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 3:
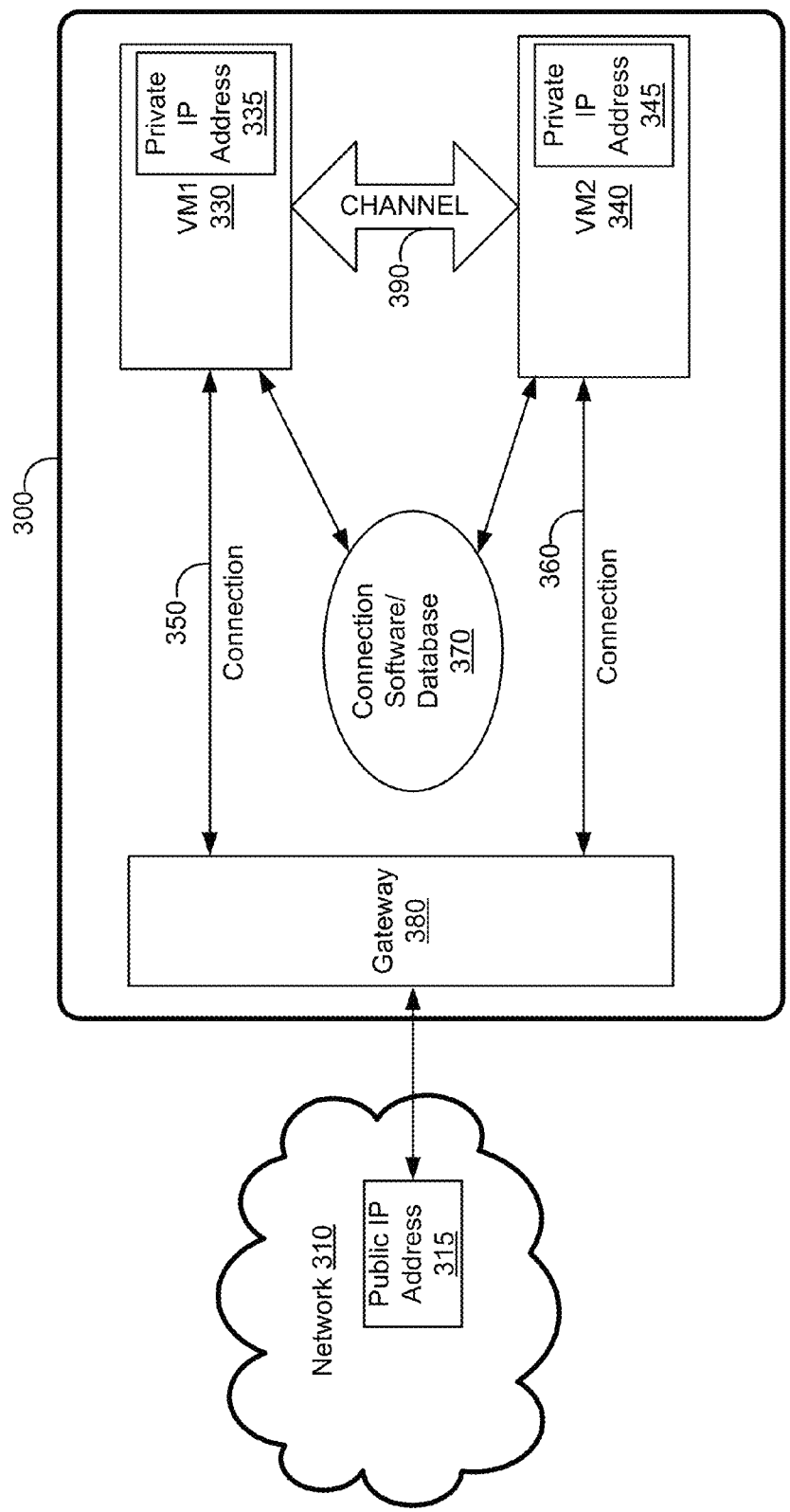
FIG. 3 is a diagram illustrating a mechanism for providing reconfigurable access to computing resources in accordance with the present disclosure.

FIG. 3 is a diagram illustrating a mechanism for providing reconfigurable access to computing resources in accordance with the present disclosure. In FIG. 3, a system 300 for providing computing resources is described according to an embodiment. System 300 may correspond, for example, to data center 110 of FIG. 2. In this example, system 300 may include virtual machine instances 330 and 340 that may correspond to virtual machine instances 118a or 118b of FIG. 2. Virtual machine instances 330 or 340 may execute, for example, on one or more servers 116a or 116b in FIG. 2, which are not shown in FIG. 3 for clarity. It will be appreciated that some embodiments may involve additional virtual machine instances that may be instantiated on additional servers.

FIG. 3 also illustrates public network 310 that may correspond to communications network 130 of FIG. 2. Public network 310 may include one or more computers such as computers 102a and 102b of FIG. 2. According to one embodiment, virtual machine instance 330 may be configured to provide computing services to a computer user (not shown) of public network 310. For example, virtual machine instance 330 may provide a set of remote access enterprise applications to a group of users who may, for example, be employees of an enterprise customer. The users may be able to access the enterprise applications by using a client application, such as a web browser, and navigate, for example, to a public IP address 315 associated with virtual machine instance 330. Virtual machine instance 330 may be mapped to private IP address 335 within system 300. The user navigating to public IP address 315 may be prompted for authentication credentials using, for example, an authentication service (not shown). Upon entering valid authorization credentials, a connection 350 may be established.

In some cases the enterprise customer providing remote access enterprise applications to users on virtual machine instance 330 may wish to remap its allocated public IP address 315 from virtual machine instance 330 to virtual machine instance 340. In one embodiment, system 300 may provide the ability to request and obtain multiple virtual machine instances that may be mapped to one or more public IP addresses. A customer may further be provided the capability to remap an allocated public IP address from a first virtual machine instance to a second virtual machine instance. Such a feature may be useful, for example, to allow a user to scale its computer resource capacity as computing requirements change. In other embodiments, an administrator of system 300 may remap IP virtual machines to reallocate resources, upgrade services, upgrade hardware and/or software, and other reasons.

In one example, a user may desire to obtain a new virtual machine instance with increased memory capacity and run an updated set of applications. The user may start the virtual machine instance and then remap its allocated public IP address to a new private IP address corresponding to the new virtual machine instance. As explained previously, a device such as gateway 380 of FIG. 3 may be configured to translate the allocated public IP address to a corresponding private IP address of a virtual machine instance. When the user remaps the user's allocated public IP address to the private IP address of the new virtual machine instance, gateway 380 may update its mapping information so that messages addressed to the user's public IP address will now have the destination address translated to point to the private IP address of the new virtual machine instance.

Referring back to FIG. 3, one drawback of remapping from the private IP address of virtual machine instance 330 to the private IP address of virtual machine instance 340 is that any existing user connections 350 that are active at the time of the remapping may be broken. For example, if a connection to virtual machine instance 330 is active, a remapping from private IP address 335 of virtual machine instance 330 to private IP address 345 of virtual machine instance 340 may result in a loss of mapping of packets between public IP address 315 and virtual machine instance 330. Although a new connection can be established between public IP address 315 and virtual machine instance 340, the loss and reestablishment of the connection can be disruptive to the user and result in a poor customer experience.

According to an embodiment, a data center customer can request a remapping of an allocated public IP address from a first virtual machine instance to a second virtual machine instance while maintaining existing connections on the first virtual machine instance. Since each virtual machine instance is associated with a unique private IP address, the mapping of the public IP address to the corresponding private IP address is updated.

Figure 4A:
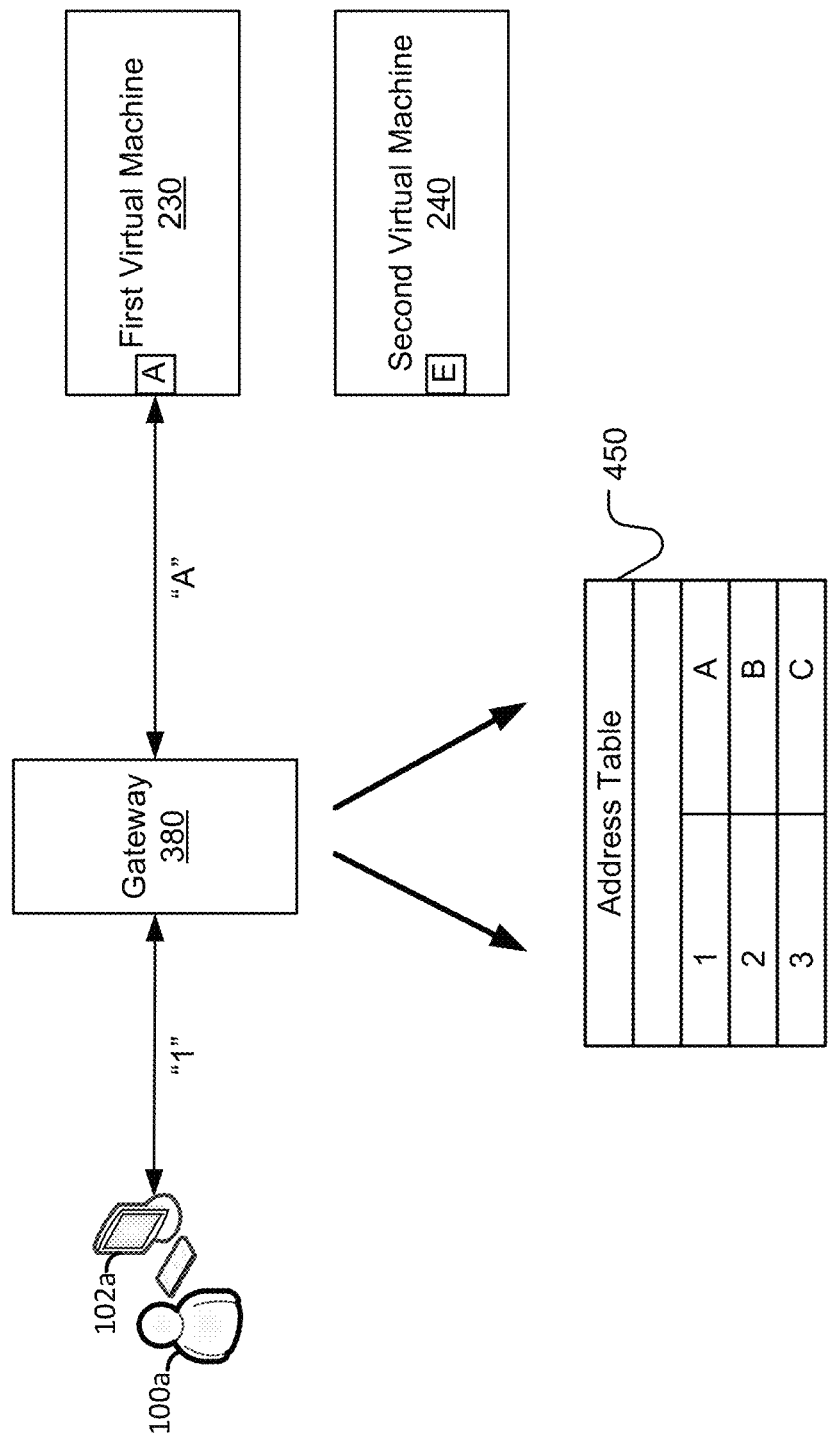
FIG. 4A is a diagram illustrating network address mapping.
Figure 4B:
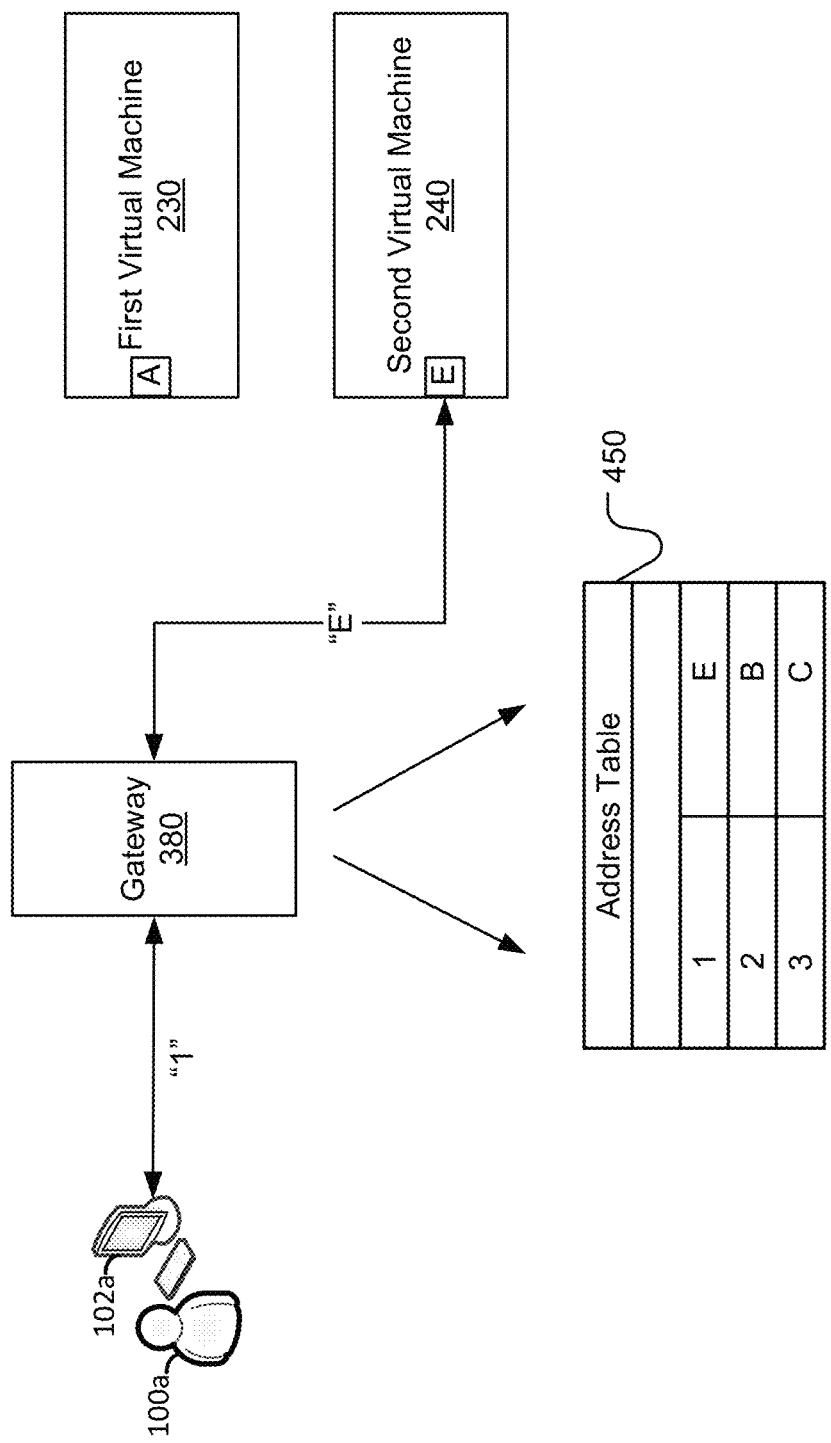
FIG. 4B is a diagram illustrating network address mapping.

FIGS. 4A and 4B illustrate an example remapping scenario that provides further detail to the embodiment described in FIG. 3. FIG. 4A depicts computer 102a associated with user 100a communicating to virtual machine instance 230 via gateway 380. In this example, gateway 380 may store thereon or have access to address table 450 that provides translation information between first network addresses and second network addresses. For example, when a message is received from computer 102a addressed to first network address "1" that is associated with virtual machine instance 230, gateway 380 translates the first network address "1" to second network address "A" which in this example corresponds to virtual machine instance 230. Likewise, first network address "2" may map to second network address "B" and first network address "3" may map to second network address "C". When virtual machine instance 240 is brought online and resources associated with first network address "1" are remapped to virtual machine instance 240, then address table 450 may be updated as illustrated in FIG. 4B.

In FIG. 4B, address table 450 is shown as having first network address "1" remapped to second network address "E" which corresponds to virtual machine instance 240. Accordingly, messages addressed to first network address "1" will now be routed to virtual machine instance 240.

Referring back to FIG. 3, a user may request the services of virtual machine instance 330 in data center 300. Furthermore, a user computer connected to public network 310 may establish a connection to resources associated with public IP address 315 that is mapped to virtual machine instance 330 via its translated private IP address 335. In an embodiment, before remapping virtual machine instance 330 to virtual machine instance 340, a communications channel 390 may be established between virtual machine instances 330 and 340. In some embodiments, communications channel 390 may be a dedicated communications channel using a tunneling protocol such as IP-in-IP, secure shell (SSH), etc. Such a dedicated communication channel may be configured to encapsulate data packets without changing the content of the data packet. In other embodiments, the destination address of the data packet may be changed to private IP address 345 associated with virtual machine instance 340.

In an embodiment, connection tracking software and database 370 may be used to keep track of active connections between user computers and virtual machine instances 330 and 340. In some embodiments, connection tracking software and database 370 may receive information from virtual machine instances 330 and 340 when connections are established and when connections are closed. Connection tracking software and database 370 may track this information and allow the information to be accessed by virtual machine instances 330 and 340 as well as any other virtual machine instances that request the information. Connection tracking software and database 370 may reside on a server or other computing resource in data center 300. Connection tracking software and database 370 may in some embodiments be managed by a VMM or other management software executing in data center 300. Connection tracking software and database 370 may also execute on one or more virtual machines.

In an embodiment, when virtual machine instance 340 receives a message from gateway 380 via its connection 360, virtual machine instance 340 may communicate with connection tracking software and database 370 and determine if the received message is associated with a connection being tracked by the connection tracking software and database 370. If the received message is associated with an existing connection which is not a new connection request, virtual machine instance 340 may translate the received message's destination address (e.g., perform NAT of the destination address) to private IP address 335 of virtual machine instance 330. Virtual machine instance 340 may then forward the message to virtual machine instance 330 via communications channel 390. Virtual machine instance 340 may also provide information to connection tracking software and database 370 so that the forwarding decision can be tracked. Virtual machine instance 340 may forward other messages to virtual machine instance 330 that are not new connection requests and are associated with existing connections.

If virtual machine instance 340 receives a message that is a new connection request, then virtual machine instance 340 may accept it locally and process the new connection request. In some embodiments, new connection requests can be a TCP SYN message or a TCP ACK message. In this manner, new connections can be associated with virtual machine instance 340 and only older active connections associated with virtual machine instance 330 need to be forwarded to virtual machine instance 330. Additionally, as the older active connections are dropped and new connections are established by virtual machine instance 340, at some point no active connections will exist for virtual machine instance 330. At this point, connection tracking software and database 370 may update the database to indicate that public IP address 315 is only applicable to virtual machine instance 340. Since no connections to virtual machine instance 330 need to be supported, communications channel 390 may be deleted. Additionally, virtual machine instance 330 may be brought offline as needed.

When virtual machine instance 330 receives forwarded messages from virtual machine instance 340 via channel 390, any reply messages pertaining to that connection may be sent back to virtual machine instance 340 via channel 390. Virtual machine instance 340 may then transmit the reply message to gateway 380 for address translation and forwarding to the appropriate user computer in public network 310. In this way, since public IP address 315 is now associated with virtual machine instance 340, messages associated with virtual machine instance 330 that were forwarded from virtual machine instance 340 via the method described above will be returned to the appropriate user computer from virtual machine instance 340.

Figure 5:
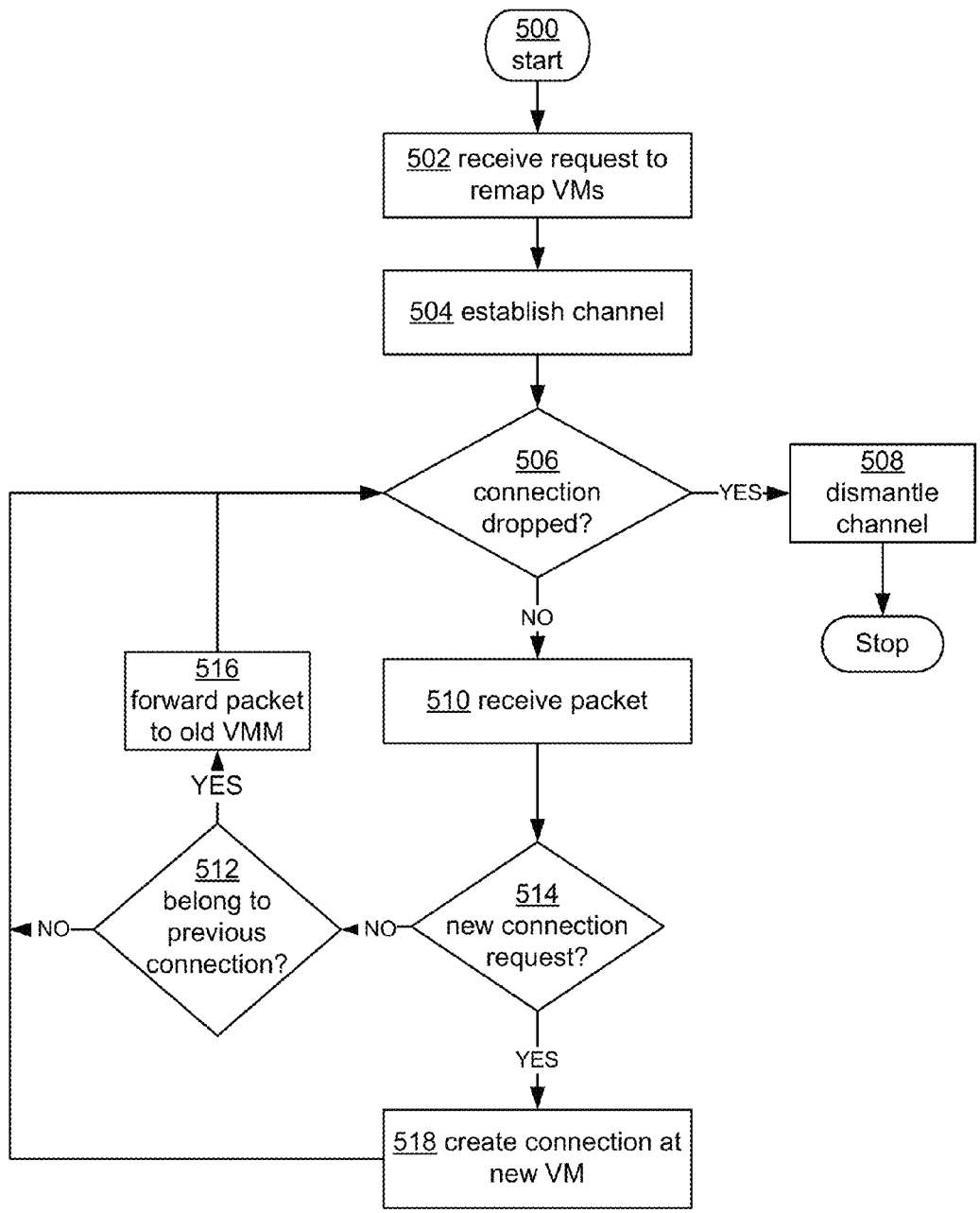
FIG. 5 is a flowchart depicting an example procedure for providing reconfigurable access to computing resources in accordance with the present disclosure.

FIG. 5 illustrates an example operational procedure for providing reconfigurable access to computing resources. In an embodiment, a network gateway device, such as gateway device 120 in FIG. 2 or gateway device 380 in FIG. 3, may receive packets and translate the public IP address in the packet's destination address to one of a plurality of private IP addresses on a private network. The plurality of private IP addresses may correspond to respective ones of a plurality of virtual machine instances corresponding to the public IP address. For example, referring to FIG. 3, public IP address 315 in the packet's destination address may be translated to private IP address 335. Private IP address 335 may in turn correspond to virtual machine instance 330 which is mapped to public IP address 315. Moreover, a first connection may be established to the public IP address (e.g., public IP address 315) using the first private IP address corresponding to the first virtual machine instance.

Referring to FIG. 5, operation 500 begins the operational procedure. Operation 500 may be followed by operation 502. Operation 502 illustrates receiving a request to remap virtual machine instances. In an embodiment, an IP address on a first network (e.g., public IP address in FIG. 3) may be remapped from a first one of a plurality of IP addresses on a second network (e.g., private IP address 335 in FIG. 3) to a second one of the plurality of private IP addresses on the second network (e.g., private IP address 345 in FIG. 3). Each of the plurality of IP addresses on the second network may correspond to respective virtual machine instances (e.g., virtual machine instances 330 and 340 in FIG. 3). Furthermore, a first connection to the IP address on the first network may have been established using the first IP address on the second network corresponding to the first virtual machine instance.

Operation 502 may be followed by operation 504. Operation 504 illustrates establishing a communication channel between the first and second virtual machine instances corresponding to the first one of the plurality of IP addresses on the second network and the second one of the plurality of private IP addresses on the second network. As discussed above, in an embodiment the communication channel may be implemented using a tunneling protocol such as IP-in-IP or SSH. In other embodiments, the communication channel may be any dedicated channel via which the first and second virtual machine instances may forward messages.

Operation 504 may be followed by operation 506. Operation 506 illustrates determining if the first connection was dropped or otherwise is no longer active. If the first connection was dropped, then operation 506 may be followed by operation 508 in which the communication channel established in operation 504 may be dismantled and the operational procedure may terminate. Additionally and optionally, the first virtual machine instance may be placed offline.

If the first connection was not dropped, then operation 506 may be followed by operation 510. Operation 510 illustrates receiving a packet. The packet may be received from a first network such as public network 310 of FIG. 3. Operation 510 may be followed by operation 514. Operation 514 illustrates determining if the packet contains a request to initiate a second connection to the IP address on the first network. If the packet contains a request to initiate the second connection to the IP address on the first network, operation 514 may be followed by operation 518. Operation 518 illustrates establishing the second connection using the second virtual machine instance. If the packet does not contain a request to initiate the second connection to the IP address on the first network, then operation 514 may be followed by operation 512. Operation 512 illustrates determining if the received packet is associated with the first connection. If the received packet is associated with the first connection, then operation 512 may be followed by operation 516. Operation 516 illustrates forwarding, via the tunnel, the packet to the first virtual machine instance. If the packet is not associated with the first connection, then operation 512 may be followed by operation 506.

Figure 6:
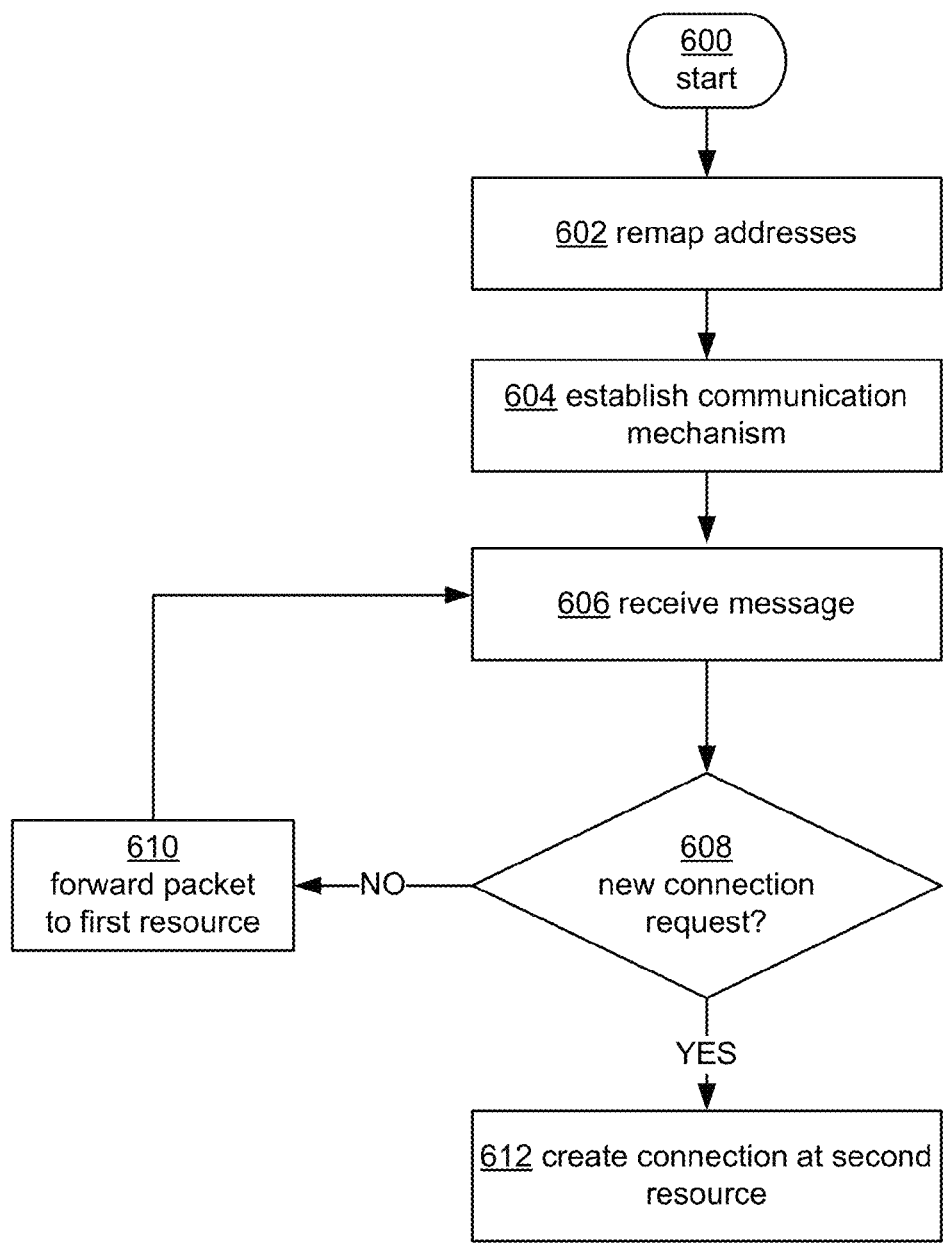
FIG. 6 is a flowchart depicting an example procedure for providing reconfigurable access to computing resources in accordance with the present disclosure.

FIG. 6 illustrates another example operational procedure for providing reconfigurable access to computing resources. Referring to FIG. 6, operation 600 begins the operational procedure. Operation 600 may be followed by operation 602. Operation 602 illustrates receiving a request to remap a network address on a first network from a first network address on a second network to a second network address on the second network. In an embodiment, the first and second network addresses on the second network may correspond to first and second computing resources, respectively. As discussed above, the computing resources in some embodiments may be virtual machine instances. In some embodiments, the first and second computing resources may have different resource allocations and/or capabilities. Furthermore, messages from the first and second computing resources may be mapped to the network address on the first network.

Operation 602 may be followed by operation 604. Operation 604 illustrates establishing a communication mechanism between the first and second computing resources. In some embodiments, the communication mechanism may comprise a communication tunnel In other embodiments, the communication mechanism may comprise translating a destination address and forwarding the message using the translated destination address. Operation 604 may be followed by operation 606. Operation 606 illustrates receiving a message. The message may be received from a first network such as public network 210 of FIG. 2.

Operation 606 may be followed by operation 608. Operation 608 illustrates determining if the received message includes a request to initiate a connection to the network address on the first network.

If the received message contains a request to initiate a connection to the network address on the first network, then operation 608 may be followed by operation 612. Operation 612 illustrates establishing the requested connection using the second computing resource. If the message does not contains a request to initiate a connection to the IP address on the first network, then operation 608 may be followed by operation 610. Operation 610 illustrates forwarding, via the communication mechanism, messages associated with previously established connections to the first computing resource.

In some embodiments, the destination addresses of the received messages may be translated using a stateless network edge device such as gateway 380 of FIG. 3. Additionally, a tracking function may be used to track connections associated with the first and second computing resources. In some embodiments, the tracking software may be implemented in software. Additionally and optionally, the tracking software may execute on the first or second computing resource. One of the first or second computing resources may be selected to run the tracking software based on characteristics of the first or second computing resources. Alternatively, the tracking software may execute on a virtual machine manager (VMM), hypervisor, or other component such as a network routing device or other device accessible by the first or second computing resources.

In an embodiment, messages associated with the requested connection and addressed to the network address on the first network may be sent to the second computing resource via the communication mechanism. Furthermore, messages associated with the previously established connections and addressed to the IP address on the first network may be sent from the second computing resource. In other embodiments, messages associated with the requested connection and addressed to the external network address may be sent from the first computing resource.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for providing reconfigurable access to computing resources, the system comprising a processor and memory, the system configured to:
    establish a first connection to an Internet Protocol (IP) address on a first network using a first IP address corresponding to a first virtual machine instance on at least one other network;
    remap an the IP address on a the first network from a the first IP address corresponding to a the first virtual machine instance to a second IP address corresponding to a second virtual machine instance on the at least one other network;
    establish a communication tunnel between the first and second virtual machine instances;
    track existing connections to the IP address on the first network;
    in response to the second virtual machine receiving a packet from the first network containing a request to initiate a second connection to the IP address on the first network when a first connection is established to the first virtual machine instance, establish the second connection using the second virtual machine instance and translate subsequent packets associated with the IP address on the first network to the second IP address corresponding to the second virtual machine instance; and
    based at least in part of on said tracking, forward, via the communication tunnel, the received packet to the first virtual machine instance if the received packet is associated with the first connection.

2. The system according to claim 1, further configured to:
receive a packet from the first network; and
translate an IP address in the packet to a first one of a plurality of IP addresses on a second network, the first one of the plurality of IP addresses corresponding to a first one of a plurality of virtual machine instances corresponding to the IP address received from the first network.

3. The system according to claim 2, wherein the IP address corresponding to the second virtual machine instance is a second one of the plurality of IP addresses on the second network.

4. The system according to claim 3, further configured to forward packets associated with the connection and addressed to the IP address on the first network to the second virtual machine instance via the tunnel.

5. The system according to claim 4, further configured to send the packets associated with the connection addressed to the IP address on the first network from the second virtual machine instance.

6. The system according to claim 3, further configured to:
send packets associated with the connection to the IP address on the first network from the first virtual machine instance.

7. The system according to claim 1, further configured to use a tracking database to track connections associated with the first and second virtual machine instances.

8. The system according to claim 1, wherein the request to initiate the packet is a TCP SYN packet.

9. A method for providing reconfigurable access to computing resources, the system comprising:
establishing a first connection to a network address on a first network using a first network address corresponding to a first computing resource on at least one other network;
remapping the network address on the first network from the first network address corresponding to the first computing resource to a second network address corresponding to a second computing resource on the at least one other network;
establish a communication mechanism between the first and second computing resources;
track existing connections to the network address on the first network;
in response to the second computing resource receiving a message from the first network containing a request to initiate a second connection to the network address on the first network when a first connection is established to the first computing resource, establish the second connection using the second computing resource and translate subsequent packets associated with the network address on the first network to the second network address corresponding to the second computing resource; and
based at least in part of on said tracking, forwarding, via the communication mechanism, the received packet to the first computing resource if the received packet is associated with the first connection.

10. The method of claim 9, wherein the network address is translated using a stateless network edge device.

11. The method of claim 9, wherein the first and second computing resources are virtual machine instances.

12. The method of claim 9, wherein the communication mechanism comprises a communication tunnel.

13. The method of claim 9, wherein the communication mechanism comprises translating a destination address and forwarding the message using the translated destination address.

14. The method of claim 9, further comprising mapping messages from the first and second computing resources to the network address on the first network.

15. The method of claim 9, further comprising sending messages associated with the requested connection and addressed to the network address on the first network to the second computing resource via the communication mechanism.

16. The method of claim 15, further comprising sending messages associated with the previously established connections and addressed to the network address on the first network from the second computing resource.

17. The method of claim 9, further comprising sending messages associated with the previously established connections and addressed to the network address on the first network from the first computing resource.

18. A non-transitory computer-readable storage medium having stored thereon computer-readable instructions, the computer-readable instructions comprising instructions that upon execution on a computing node, at least cause:
establishing a first connection to a network address on a first network using a first network address corresponding to a first virtual machine instance on at least one other network;
remapping the network address on the first network from the first network address corresponding to the first virtual machine instance to a second network address corresponding to a second virtual machine instance on the at least one other network;
establishing a communication mechanism between the first and second virtual machine instances;
tracking existing connections to the network address on the first network;
in response to the second virtual machine instance receiving a message from the first network containing a request to initiate a second connection to the network address on the first network when a first connection is established to the first virtual machine instance, establishing the second connection using the second virtual machine instance and translating subsequent packets associated with the network address on the first network to the second network address corresponding to the second virtual machine instance; and
based at least in part of on said tracking, forwarding, via the communication mechanism, the received message to the first virtual machine instance if the received message is associated with the first connection.

19. The computer-readable medium of claim 18, further comprising computer-readable instructions that upon execution on the computing node, at least cause executing a tracking function to perform said tracking.

20. The computer-readable medium of claim 19, wherein the tracking function executes on the first and second virtual machine instances.

* * * * *